United States Patent
Varshney

(10) Patent No.: US 12,530,787 B2
(45) Date of Patent: Jan. 20, 2026

(54) TECHNIQUES FOR DIGITAL IMAGE REGISTRATION

(71) Applicant: AIDASH, Inc., Palo Alto, CA (US)

(72) Inventor: Kanishk Varshney, Gurgaon (IN)

(73) Assignee: AIDash, Inc., Palo Alto, CA (US)

( * ) Notice: Subject to any disclaimer, the term of this patent is extended or adjusted under 35 U.S.C. 154(b) by 320 days.

(21) Appl. No.: 18/069,842

(22) Filed: Dec. 21, 2022

(65) Prior Publication Data

US 2024/0212174 A1    Jun. 27, 2024

(51) Int. Cl.
  *G06T 7/32*    (2017.01)

(52) U.S. Cl.
  CPC ...... *G06T 7/32* (2017.01); *G06T 2207/10032* (2013.01); *G06T 2207/20021* (2013.01)

(58) Field of Classification Search
  CPC .. G06T 7/32; G06T 7/33; G06T 7/344; G06T 2207/10032; G06T 2207/20021; G06T 7/30–38; G06T 7/337; G06V 10/751; G06V 10/24–248
  See application file for complete search history.

(56) References Cited

U.S. PATENT DOCUMENTS

| | | | | |
|---|---|---|---|---|
| 5,550,937 A | * | 8/1996 | Bell | G06T 3/153 |
| | | | | 382/293 |
| 5,986,668 A | * | 11/1999 | Szeliski | G06T 7/33 |
| | | | | 345/634 |
| 2008/0192053 A1 | * | 8/2008 | Howell | G06T 7/30 |
| | | | | 382/295 |
| 2008/0300477 A1 | | 12/2008 | Lloyd et al. | |
| 2012/0002899 A1 | * | 1/2012 | Orr, IV | H04N 23/6811 |
| | | | | 382/282 |
| 2014/0176731 A1 | * | 6/2014 | Geiss | G06T 7/30 |
| | | | | 348/207.1 |
| 2016/0042516 A1 | * | 2/2016 | Tieu | G06V 40/13 |
| | | | | 382/203 |

(Continued)

OTHER PUBLICATIONS

Reddy BS, Chatterji BN. An FFT-based technique for translation, rotation, and scale-invariant image registration. IEEE Trans Image Process. 1996;5(8):1266-71. doi: 10.1109/83.506761. PMID: 18285214.

(Continued)

*Primary Examiner* — Andrew W Bee
*Assistant Examiner* — Caleb L Esquino
(74) *Attorney, Agent, or Firm* — Ahmann Kloke LLP

(57) ABSTRACT

Example systems, methods, and non-transitory computer readable media are directed to obtaining a first image and a second image, wherein the second image is an image to be evaluated with respect to the first image for alignment; generating tiles for the first image and the second image; measuring one or more respective alignment offsets between a plurality of tiles associated with the second image and corresponding tiles associated with the first image; classifying the plurality of tiles as aligned or misaligned based on the respective alignment offsets measured; determining that the classified plurality of tiles associated with the second image satisfy a tile threshold; and co-registering the second image with the first image based at least in part on the determination that the classified plurality of tiles associated with the second image satisfy the tile threshold.

19 Claims, 11 Drawing Sheets

(56) References Cited

U.S. PATENT DOCUMENTS

| | | | |
|---|---|---|---|
| 2016/0350893 A1 | 12/2016 | Fletcher | |
| 2017/0243351 A1* | 8/2017 | Li | G06T 3/18 |
| 2018/0174326 A1* | 6/2018 | Katchalov | G06T 7/37 |
| 2020/0043134 A1* | 2/2020 | Martin | G06T 3/4038 |
| 2020/0126242 A1* | 4/2020 | Fang | G06T 7/74 |
| 2021/0042941 A1* | 2/2021 | Zhen | G06T 7/215 |
| 2022/0038172 A1 | 2/2022 | Kargieman et al. | |
| 2023/0162403 A1* | 5/2023 | Tian | G06T 9/001 |

OTHER PUBLICATIONS

Rittavee Matungka, Yuan F. Zheng and Robert L. Ewing, "Image Registration Using Adaptive Polar Transform," IEEE Transactions on Image Processing, vol. 18, No. 10, Oct. 2009, pp. 2340-2354.

Xie, Hongjie, Nigel Hicks, G. Randy Keller, Haitao Huang and Vladik Kreinovich. "An IDL/ENVI Implementation of the FFT Based Algorithm for Automatic Image Registration." Computers & Geosciences 29 (2003):1045-1055.

International Application No. PCT/US2023/083876, International Search Report and the Written Opinion, dated Apr. 3, 2024, 9 pages.

\* cited by examiner

Reference Image

Evaluated Image

TECHNIQUES FOR DIGITAL IMAGE REGISTRATION

FIELD OF THE INVENTION(S)

Embodiments of the present inventions relate generally to techniques for digital image registration (or co-registration) and more particularly to techniques and metrics for alignment of images.

BACKGROUND

Image registration (or co-registration) is an image processing technique used to geometrically align a series of images within a single coordinate system. For example, medical images may be taken of a patient's internal organ over a period of time. In this example, the organ may be appear visually different in images captured at different points in time, for example, due to use of different types of imaging equipment. These visual differences can make it difficult to meaningfully compare images or measure changes over time.

There are many reasons why on object may differ visually from image to image. One example reason why subject matter may differ visually from image to image is image rotation, which may occur when the images are captured from different angles. Another example reason why subject matter may differ visually from image to image is image scaling. In general, image scaling refers to changes in a size of subject matter represented in the images, which may be influenced by a distance from which a given image is captured. Yet another example reason why subject matter may differ visually from image to image is image shift. In general, image shift refers to changes in a position of subject matter represented in the images along one or more axes.

Regardless of the types of imagery being analyzed, in order to meaningfully compare a series of images and measure changes in subject matter over time, the images may need to be registered based on an image registration technique.

SUMMARY

Example systems, methods, and non-transitory computer readable media are directed to obtaining a first image and a second image, wherein the first image is a reference image that serves as ground truth data, and wherein the second image is an image to be evaluated with respect to the first image for alignment; generating tiles for the first image and the second image, wherein the first image is divided into a grid of tiles, and wherein the second image is divided into a corresponding grid of tiles; measuring one or more respective alignment offsets between each of a plurality of tiles associated with the second image and corresponding tiles associated with the first image; classifying each of the plurality of tiles as aligned or misaligned based on the respective alignment offsets measured between the plurality of tiles associated with the second image and the corresponding tiles associated with the first image; determining that the classified plurality of tiles associated with the second image satisfy a tile threshold; and co-registering the second image with the first image based at least in part on the determination that the classified plurality of tiles associated with the second image satisfy the tile threshold.

According to some embodiments, the first image is a satellite image of a geographic region, and the second image is a satellite image of the geographic region captured at a different point in time.

According to some embodiments, measuring the one or more respective alignment offsets between each of the plurality of tiles associated with the second image and the corresponding tiles associated with the first image includes applying one or more phase correlation techniques to a tile associated with the second image and a corresponding tile associated with the first image, wherein the respective alignment offsets between the tile associated with the second image and the corresponding tile associated with the first image are measured in a frequency domain.

According to some embodiments, an alignment offset measured between the tile associated with the second image and the corresponding tile associated with the first image provides an amount of rotation between the tile associated with the second image and the corresponding tile associated with the first image.

According to some embodiments, an alignment offset measured between the tile associated with the second image and the corresponding tile associated with the first image provides a difference in scale between the tile associated with the second image and the corresponding tile associated with the first image.

According to some embodiments, an alignment offset measured between the tile associated with the second image and the corresponding tile associated with the first image provides an amount of shift between the tile associated with the second image and the corresponding tile associated with the first image.

According to some embodiments, classifying each of the plurality of tiles as aligned or misaligned based on the respective alignment offsets measured between the plurality of tiles associated with the second image and the corresponding tiles associated with the first image includes determining that a threshold amount of alignment offsets determined for a tile associated with the second image satisfy respective alignment thresholds associated with the alignment offsets.

According to some embodiments, determining that the classified plurality of tiles associated with the second image satisfy the tile threshold includes determining that at least a threshold percentage of the tiles associated with the second image are classified as aligned with respect to the corresponding tiles associated with the first image.

According to some embodiments, the systems, methods, and non-transitory computer readable media are further directed to normalizing the first image and the second image based on one or more image normalization techniques.

According to some embodiments, the normalization techniques include one or more of: removing shadows present in the first image or the second image; converting the first image or the second image into grayscale format; or resizing the second image to correspond to image dimensions associated with the first image.

Example systems, methods, and non-transitory computer readable media are directed to obtaining a first image and a second image, wherein the first image is a reference image that serves as ground truth data, and wherein the second image is an image to be evaluated with respect to the first image for alignment; generating tiles for the first image and the second image, wherein the first image is divided into a grid of tiles, and wherein the second image is divided into a corresponding grid of tiles; measuring one or more respective alignment offsets between each of a plurality of tiles associated with the second image and corresponding tiles associated with the first image; classifying each of the plurality of tiles as aligned or misaligned based on the respective alignment offsets measured between the plurality of tiles associated with the second image and the corresponding tiles associated with the first image; determining that the classified plurality of tiles associated with the second image satisfy a tile threshold; and categorizing the second image as being aligned or misaligned with respect to the first image based at least in part on the determination that the classified plurality of tiles associated with the second image satisfy the tile threshold.

According to some embodiments, the systems, methods, and non-transitory computer readable media are further directed to providing the second image and the first image for manual co-registration by a human operator based on the categorization of the second image as being misaligned with respect to the first image.

According to some embodiments, an alignment offset measured between the tile associated with the second image and the corresponding tile associated with the first image provides an amount of rotation between the tile associated with the second image and the corresponding tile associated with the first image.

According to some embodiments, an alignment offset measured between the tile associated with the second image and the corresponding tile associated with the first image provides a difference in scale between the tile associated with the second image and the corresponding tile associated with the first image.

According to some embodiments, an alignment offset measured between the tile associated with the second image and the corresponding tile associated with the first image provides an amount of shift between the tile associated with the second image and the corresponding tile associated with the first image.

DETAILED DESCRIPTION

In order to meaningfully compare a series of images and measure changes in subject matter over time—whether they be medical, satellite, or some other type of image—the images may need to be registered based on an image registration technique.

Figure 1A:
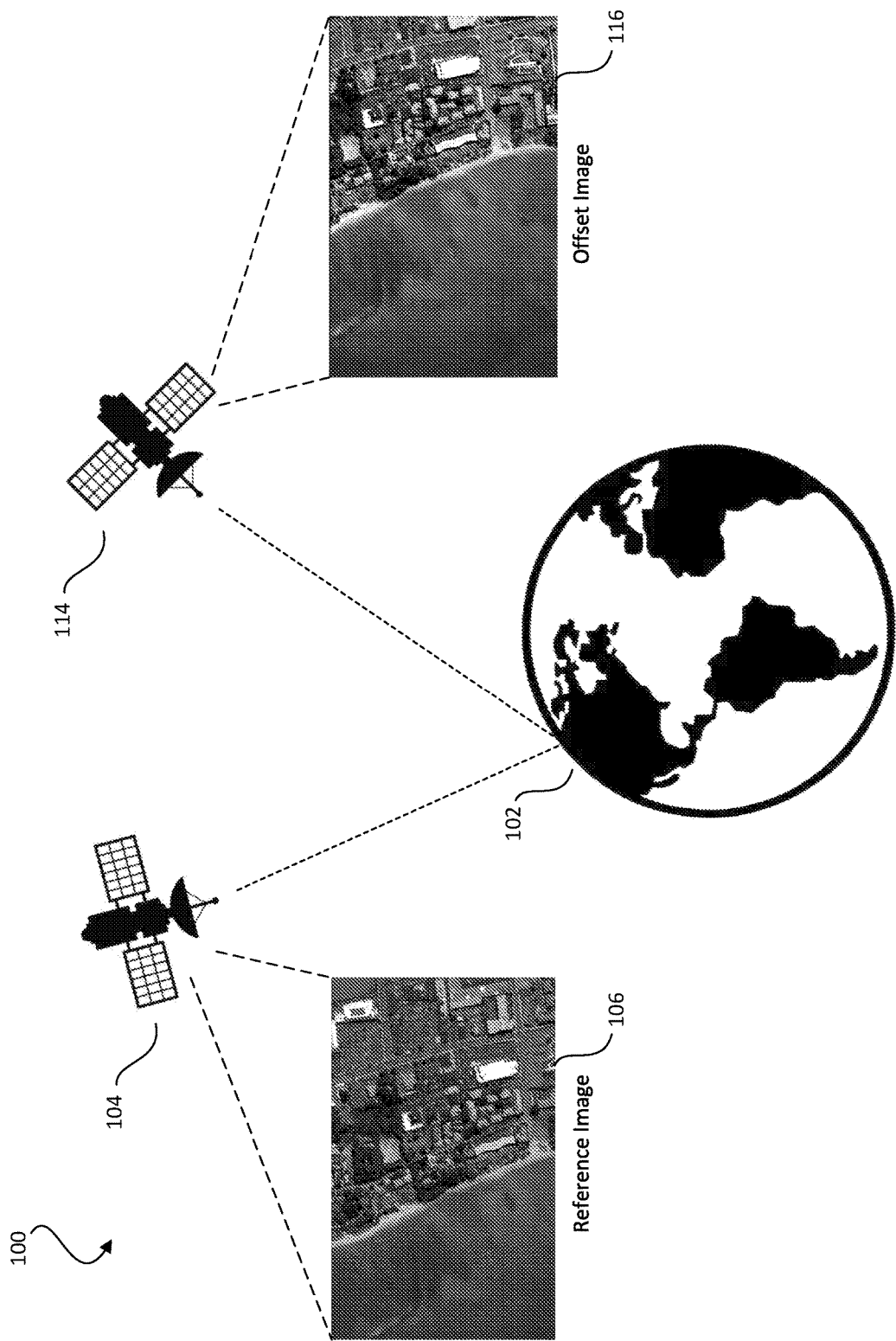
FIG. 1A depicts example satellites imaging a geographic region.

FIG. 1A illustrates an example 100 involving satellites 104, 114 imaging a geographic region 102. Each satellite 104, 114 may include at least one imaging apparatus and a data store for storing images.

For example, a first satellite 104 may image the geographic region 102 at some point in time, which results in a reference image 106 of the geographic region 102. Similarly, a second satellite 114 may image the geographic region 102 at another point in time, which results in an offset image 116 of the geographic region 102.

Images of a geographic region captured by different satellites or at different points in time may differ visually for various reasons, such as variations in satellite hardware and/or satellite positions. In this example, the geographic region 102 represented in the reference image 106 appears different from the geographic region 102 represented in the offset image 116, for example, due to shifting along at least one axis.

To compare the reference image 106 and the offset image 116, the images may need to be registered (or aligned) within a single coordinate system. There are many conventional approaches for registering images. One conventional approach for registering images is feature-based registration, which involves matching features between a pair of images, measuring offsets, and aligning the images based on the measured offsets. Another conventional approach for registering images is phase correlation, which relies on a frequency-domain representation of images to estimate a relative translative offset between the images.

Figure 1B:
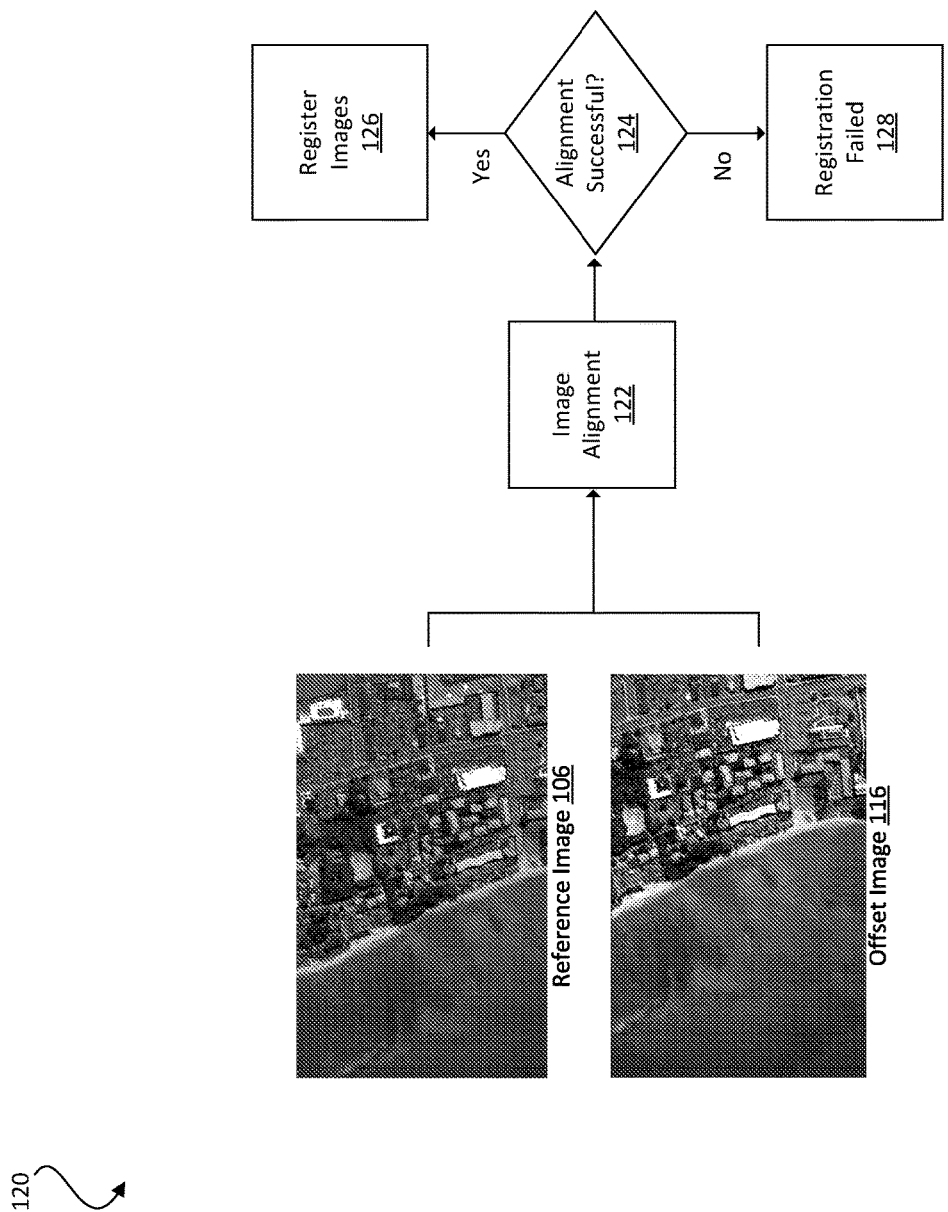
FIG. 1B depicts an example process for registering images a pair of images.

For example, FIG. 1B illustrates an example conventional process 120 for registering images. In step 122 of this example, the reference image 106 and the offset image 116 are processed using a generally known image registration technique. Some examples of image registration techniques that may be used include a Fast Fourier Transform (FFT) phase correlation, cross-correlation, Enhanced Correlation Coefficient (ECC) maximization, and feature-based registration.

Figure 1C:
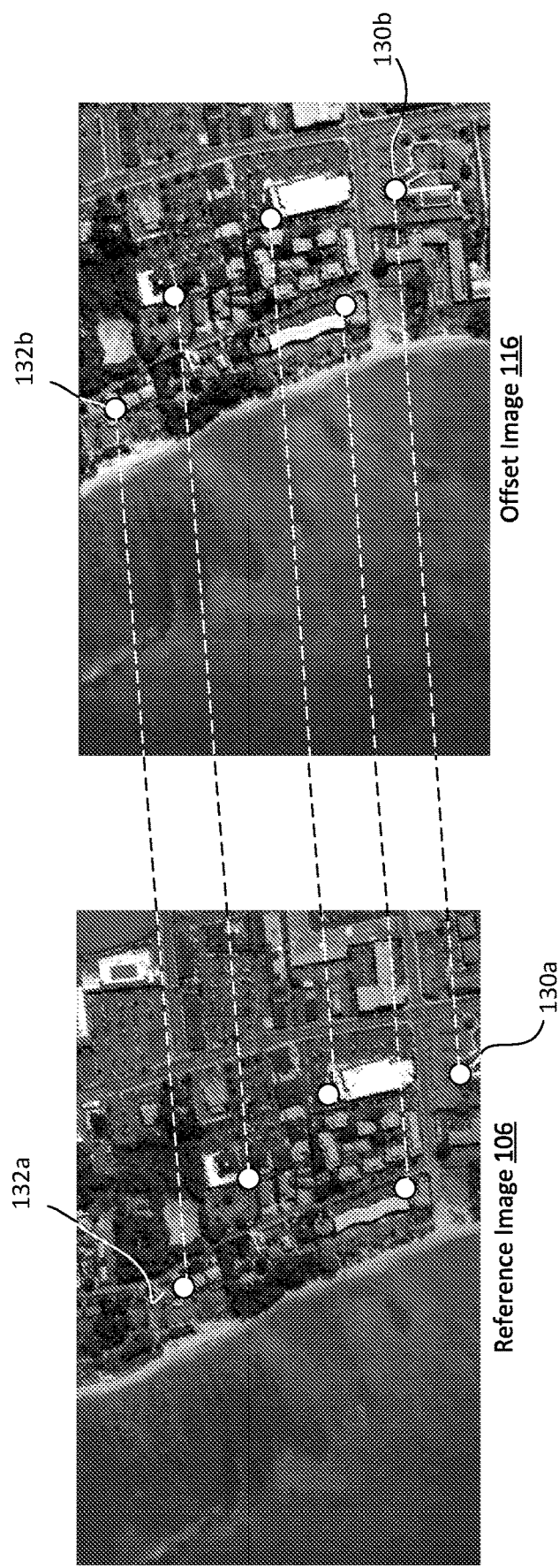
FIG. 1C depicts example tie points determined for the pair of images described in reference to FIG. 1B.

An image registration technique may analyze image features to determine respective tie points (or keypoints). For example, FIG. 1C illustrates example tie points that may be determined for the reference image 106 and the offset image 116. In the example of FIG. 1C, a tie point 130a may be determined for a geographic feature (e.g., a building) represented in the reference image 106 and a corresponding tie point 130b may be determined for a matching geographic feature in the offset image 116. Similarly, another tie point 132a may be determined for a different geographic feature (e.g., a road) represented in the reference image 106 and a corresponding tie point 132b may be determined for a matching geographic feature in the offset image 116. The number of tie points may vary and, in some instances, fifty to one hundred tie points may be determined between a pair of images.

Figure 1D:
FIG. 1D depicts an example alignment of the pair of images described in reference to FIG. 1C.

Once tie points are determined, the image registration technique may determine offsets between the tie points in the reference image 106 and the offset image 116. The offsets may measure differences between the tie points, for example, in terms of rotation, scale, or shift. Based on the offsets, the image registration technique may transform the offset image 116 so that both the reference image 106 and the offset image 116 correspond to a single coordinate system. For example, such transformation may involve digitally manipulating the offset image 116 so that the tie points between the images are substantially aligned, as illustrated by the example alignment 140 in FIG. 1D.

Once alignment is attempted, at step 124 of FIG. 1B, a determination is made whether the alignment of the tie points in the reference image 106 and the offset image 116 was successful. For example, the determination may be based on whether the alignment between all of the tie points was achieved. If the alignment is determined to be successful, at step 126, the reference image 106 and the offset image 116 are determined to be registered. In contrast, if the alignment is not successful, at step 128, the registration fails, and the images are determined to be unrelated.

The alignment may fail for any number of reasons. For instance, the alignment may fail due to the introduction of new vegetation that obstructs existing geographic features, such as buildings, which were identified as tie points in the reference image 106. In another example, the alignment may fail due to the emergence of new geographic features, such as new construction, which degrade tie point correlation. In yet another example, the alignment may fail due to weather conditions that distort geographic features, such as sun glare.

Such conventional approaches to image registration are not practical when a large number of images are being evaluated for registration. For example, when analyzing satellite imagery to measure changes in vegetation, such as a growth rate of tree canopies within a geographic region, there may be many thousands of images that need to be evaluated and registered. Attempts to evaluate and register so many images may result in significant computational and financial cost and related delays that hinder meaningful comparison of images in a timely manner.

Given such limitations associated with conventional image registration techniques, there exists a need for a solution that can efficiently classify images as being aligned or misaligned, and further process the images based on their respective classifications. In various embodiments, systems and methods discussed herein improve scalability of preexisting systems and improve image registration. Rather than attempting to completely align each image, the embodiments described herein are directed to co-registering a pair of images once a threshold level of alignment has been satisfied. The alignment may be measured based on phase correlation techniques that efficiently measure alignment offsets in a frequency domain. Thus, images that have at least a threshold level of alignment may be automatically registered and ingested more efficiently for real-time image processing pipelines. In contrast, images determined to be misaligned may be sent for further processing, for example, such as manual co-registration by a human operator. As such, various embodiments discussed herein correct limitations and errors caused by conventional technology.

Various embodiments described herein provide a claimed solution rooted in computer technology that solves a problem arising in the realm of computer technology. In various embodiments, images that are determined to be aligned based on one or more alignment thresholds may be coregistered. Alignment between images may be measured based on one or more phase correlation techniques that are capable of accurately measuring similarity between images as well as determining corresponding alignment differences, for example, in terms of rotation, scale, or shift.

Conventional image similarity measurement techniques, such as Structural Similarity Index (SSIM), are inadequate for measuring changes in images for purposes of image registration. Such techniques measure similarity between images on a pixel-by-pixel basis, and thus fail when the images are not aligned, for example, due to changes in rotation, scale, or shift. Thus, under these conventional approaches, a similarity determination between a pair of images of a particular geographic region would fail if one of the images was shifted along an axis.

Rather than relying on conventional image similarity measurement techniques, embodiments described herein employ phase correlation techniques to measure similarity and alignment between images. Unlike conventional image similarity techniques, phase correlation techniques analyze images within a frequency domain, which is far more robust in terms of detecting alignment in images than a pixel-by-pixel approach. As a result, phase correlation techniques more accurately measure image similarity even when the images are not aligned, for example, in terms of rotation, scale, shift, skew, or any other misalignment that may occur between images.

An image that is determined to be aligned with a reference image based on one or more alignment thresholds may be co-registered with the reference image. In contrast, if the image is determined to be misaligned based on the alignment thresholds, then the image may be sent for further processing. For example, the image may be co-registered manually, analyzed using a different image processing technique, or discarded.

Figure 2:
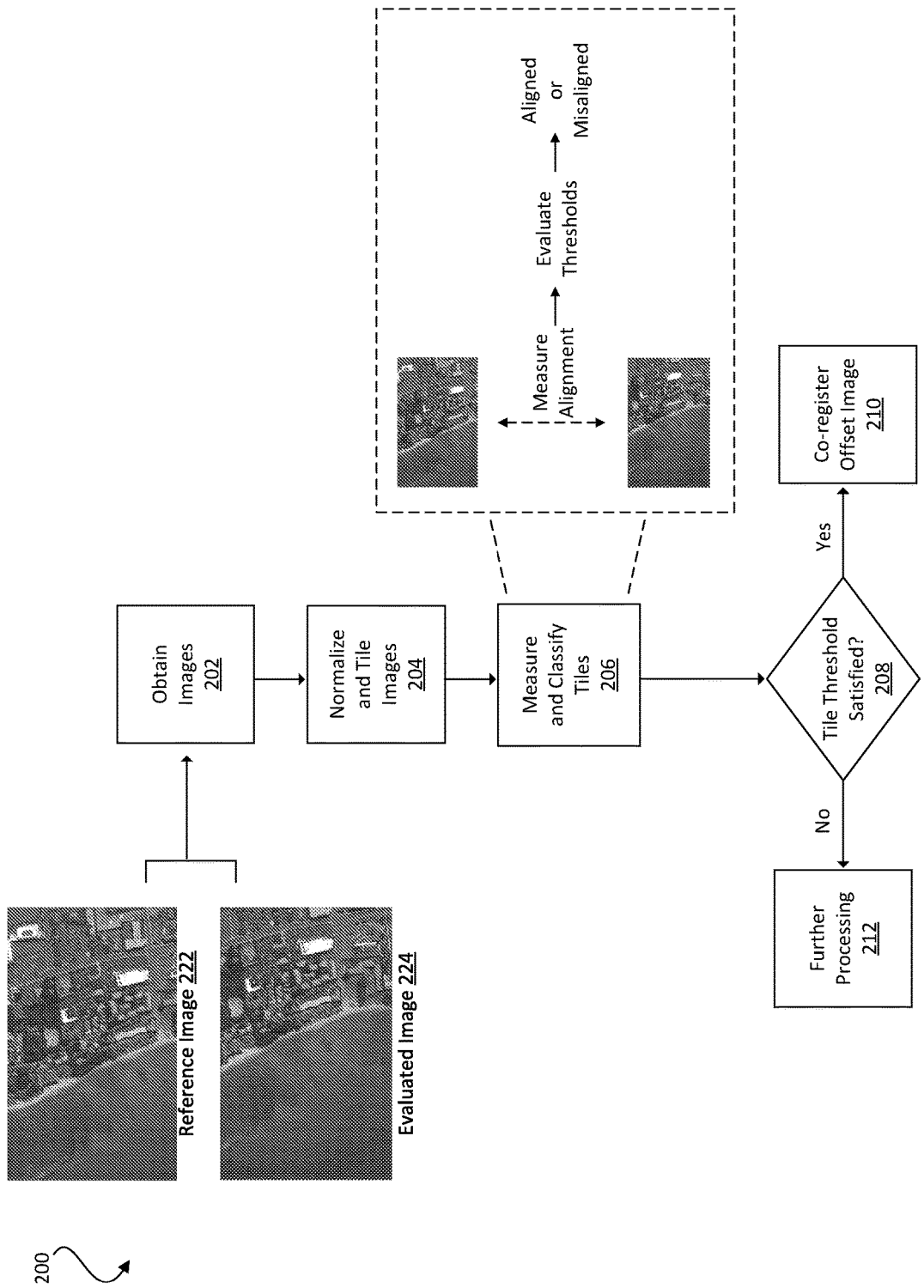
FIG. 2 depicts an example process for registering images according to some embodiments.

FIG. 2 depicts an example process 200 for registering images, according to some embodiments. The example process 200 evaluates a first image (or reference image) 222 and a second image (or evaluated image) 224 to measure alignment between the images. The first image 222 may be an image of a geographic region that was captured by a first satellite and serves as a ground truth image for the geographic region. The second image 224 may also be an image of the geographic region but one that was captured by a second satellite at another point in time. In this example, the process 200 will analyze the evaluated image 224 with respect to the reference image 222 to determine whether the images are aligned or misaligned.

In step 202, the reference image 222 and the evaluated image 224 may be obtained. For example, the reference image 222 may be obtained from a datastore (or archive) of satellite images that were captured by the first satellite. The evaluated image 224 may be obtained from a datastore (or archive) of satellite images that were captured by the second satellite.

In step 204, the reference image 222 and the evaluated image 224 may be normalized and tiled. For example, the images may be normalized using existing image normalization techniques to place the reference image 222 and the evaluated image 224 in a common statistical distribution in terms of size and pixel values.

The images may also be tiled, for example, based on a conventional tile rendering technique. For example, each image may be divided into a grid of even-sized tiles. The size of the tiles may vary depending on the implementation.

After tiling, the reference image 222 and the evaluated image 224 can be evaluated for alignment on a tile-by-tile basis. In step 206, alignment of each tile of the evaluated image 224 may be measured in relation to a corresponding tile of the reference image 222. In various embodiments, one or more phase correlation techniques may be applied to measure alignment differences between a tile of the evaluated image 224 and a corresponding tile of the reference image 222. The phase correlation techniques may provide alignment offsets between the images. In general, the phase correlation techniques may provide any measurable change between the images in terms of alignment. For example, the phase correlation techniques may provide an amount of rotation between the tile of the evaluated image 224 and the tile of the reference image 222. In another example, the phase correlation techniques may provide an amount of change in scale between the tile of the evaluated image 224 and the tile of the reference image 222. In a further example, the phase correlation techniques may provide an amount of shift between the tile of the evaluated image 224 and the tile of the reference image 222. In yet another example, the phase correlation techniques may provide an amount of skew between the tile of the evaluated image 224 and the tile of the reference image 222. Other measurements are possible.

Each measurement can be evaluated against a corresponding threshold. For example, the rotation measured between the tile of the evaluated image 224 and the tile of the reference image 222 can be evaluated with respect to a rotation threshold. Similarly, the scale measured between the tile of the evaluated image 224 and the tile of the reference image 222 can be evaluated with respect to a scale threshold. If a determination is made that each or a threshold amount of the measurements satisfy their respective thresholds, then the tile of the evaluated image 224 may be classified as being aligned with the tile of the reference image 222. In contrast, if a determination is made that the measurements do not satisfy their respective thresholds, then the tile of the evaluated image 224 may be classified as being misaligned with the tile of the reference image 222.

Once all tiles have been classified, in step 208, a determination is made whether a threshold amount of the tiles satisfy a tile threshold. For example, a determination may be made whether at least 70 percent of the tiles are classified as aligned.

In step 210, if the threshold amount of the tiles is determined to be satisfy the tile threshold, then the evaluated image 224 may be co-registered with the reference image 222. In various embodiments, the evaluated image 224 may be consumed directly for various applications, such as measuring changes in vegetation within the geographic region over time. Many other applications are possible.

In step 212, if the threshold amount of the tiles is not satisfied, then the evaluated image 224 may be submitted for further processing. For example, in some embodiments, the evaluated image 224 may be submitted for manual co-registration by a human-in-the-loop. Many variations are possible.

Figure 3:
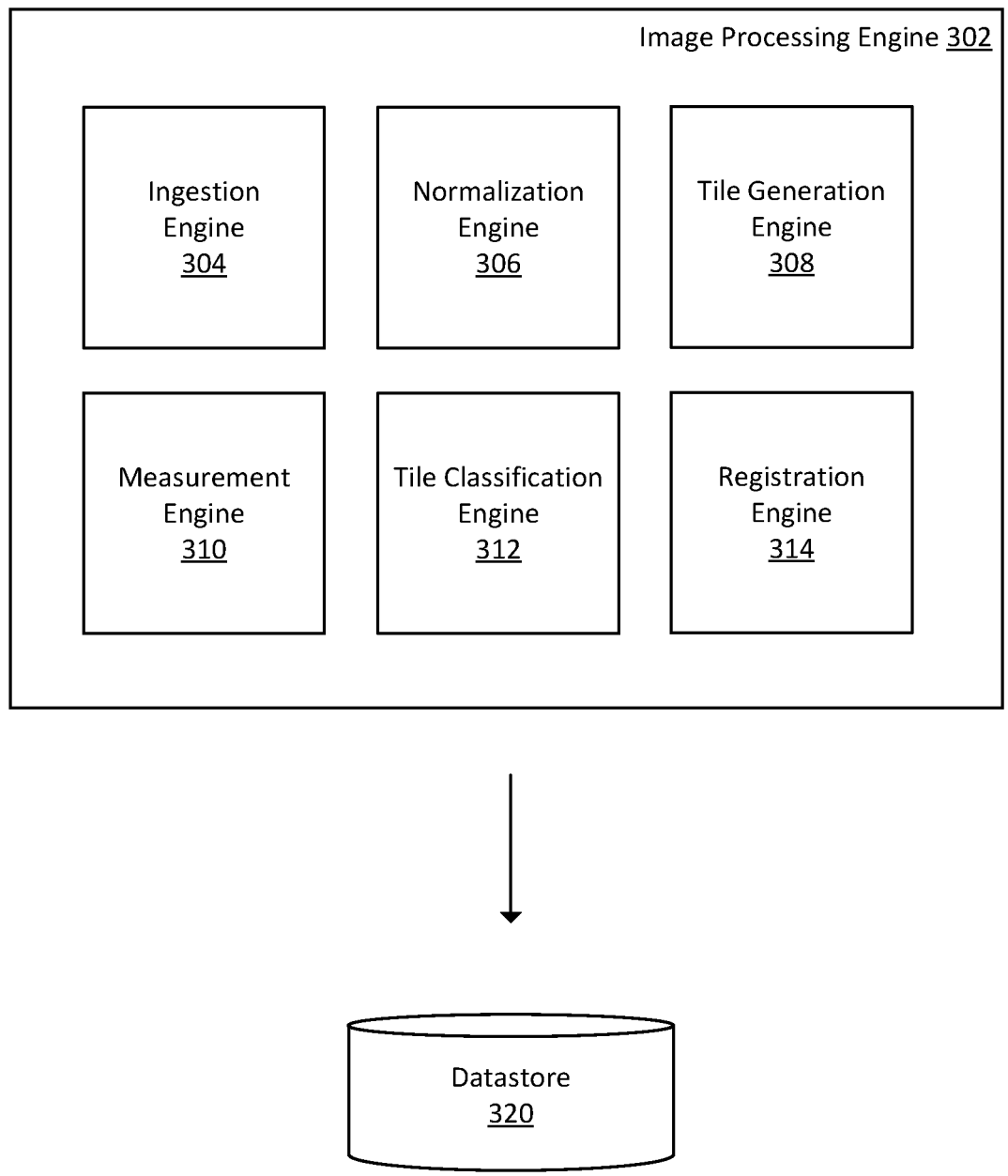
FIG. 3 depicts a block diagram of components of an image processing engine according to some embodiments.

FIG. 3 depicts a block diagram of an example image processing engine 302 according to some embodiments. The image processing engine 302 may be implemented in a computer system that includes at least one processor, memory, and communication interface. The computer system can execute software, such as image processing software, that performs any number of functions described in relation to FIG. 3.

The image processing engine 302 includes an ingestion engine 304, normalization engine 306, tile generation engine 308, measurement engine 310, tile classification engine 312, and registration engine 314. The image processing engine 302 can access a datastore 320.

Figure 4A:
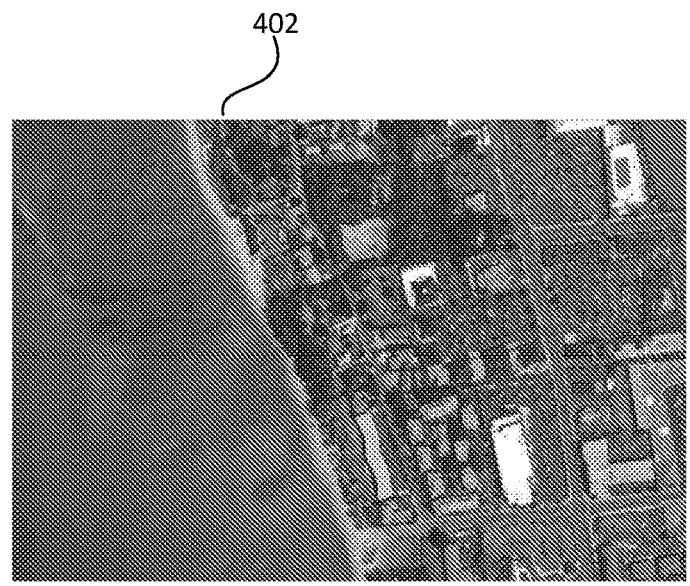
FIG. 4A illustrates example images to be evaluated according to some embodiments.
Figure 4A:

The ingestion engine 304 may be configured to obtain or receive image data to be processed. For example, the ingestion engine 304 may obtain a first image of a geographic region and a second image of the geographic region. The first image (or reference image) may be captured by a satellite and obtained, for example, from a datastore (or archive) associated with the satellite. The second image (or evaluated image) may be captured by the same satellite or a different satellite at another point in time and may be obtained, for example, from a corresponding datastore (or archive) associated with that satellite. The example 400 of FIG. 4A illustrates the reference image 402 and the evaluated image 404.

In various embodiments, the ingestion engine 304 may only be provided the evaluated image and based on the evaluated image, the ingestion engine 304 may automatically identify and obtain the reference image. For example, in some embodiments, the ingestion engine 304 may identify and obtain the reference image based on geolocation information (e.g., positional coordinates) associated with the evaluated image. In some embodiments, the ingestion engine 304 may identify and obtain the reference image based on subject matter represented in the evaluated image. In such embodiments, points of interest within the geographic region represented in the evaluated image may be identified and corroborated against a global satellite map to identify the geographic region represented in evaluated image. Based on the identified geographic information, the ingestion engine 304 can identify and obtain a corresponding reference image for the geographic region. Many variations are possible.

The normalization engine 306 may be configured to normalize images so the images correspond to a common statistical distribution, for example, in terms of size and pixel values. The normalization engine 306 may normalize the images using conventional image normalization techniques including, for example, shadow removal, grayscale conversion, local contrast normalization, local response normalization, and/or simplified whitening. For example, the normalization engine 306 may apply shadow removal techniques to correct images that were captured during the daytime or during certain seasons. The normalization engine 306 may also apply grayscale conversion techniques to convert images to grayscale format, which may help improve image processing. For example, images in grayscale may be processed more effectively using techniques, such as Discrete Fourier Transform (DFT), to generate frequency domain signals. In some instances, the normalization engine 306 may resize images being evaluated if needed to ensure consistency between image dimensions. Other normalization techniques may be applied.

Figure 4B:
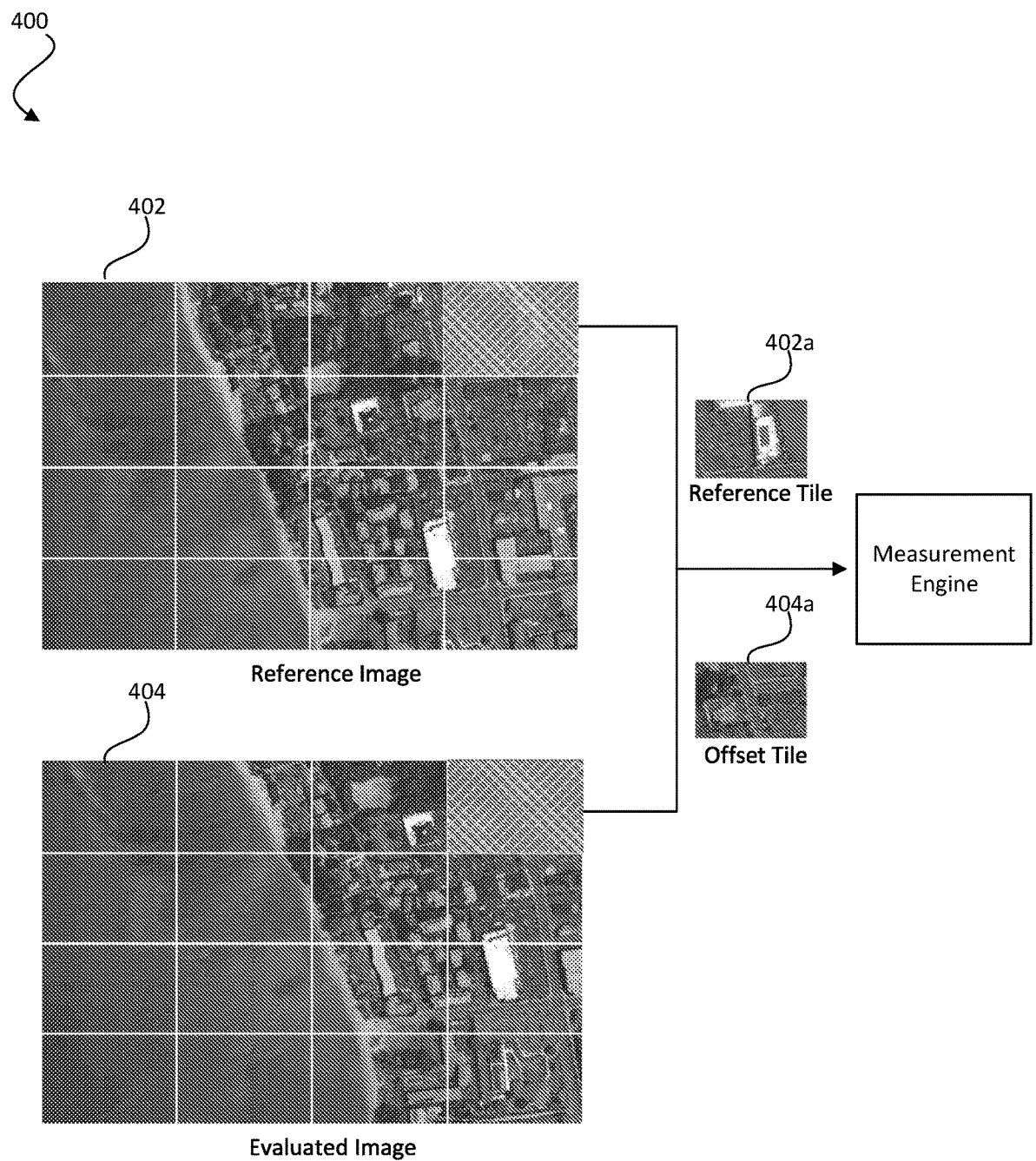
FIG. 4B illustrates an example tiling of images to be evaluated according to some embodiments.

The tile generation engine 308 may be configured to generate image tiles. In various embodiments, images may be tiled based on conventional tile rendering techniques. For example, FIG. 4B illustrates example tiles generated for the reference image 402 and the evaluated image 404. Each image may be divided into a grid of even-sized tiles. The size of the tiles may vary depending on the implementation.

Once tiled, the reference image 402 and the evaluated image 404 may be evaluated for alignment on a tile-by-tile basis. That is, each tile in the reference image 402 may be evaluated with respect to a corresponding tile in the evaluated image 404. In the example of FIG. 4B, a reference tile 402*a* and an evaluated tile 404*a* are being evaluated for alignment.

The measurement engine 310 may be configured to measure alignment between image tiles. In various embodiments, one or more phase correlation techniques are applied to measure alignment differences between a tile and a corresponding tile. For example, in FIG. 4B, the measurement engine 310 may measure alignment differences between the reference tile 402*a* and the evaluated tile 404*a*. The phase correlation techniques may provide alignment offsets between the image tiles. In general, the phase correlation techniques may provide any measurable change between the image tiles in terms of alignment.

For example, the phase correlation techniques may provide an amount of rotation between the evaluated tile 404a and the reference tile 402a. In another example, the phase correlation techniques may provide an amount of change in scale between the evaluated tile 404a and the reference tile 402a. In some embodiments, the measurement engine 310 applies a log-polar transform to determine rotation and scale offsets. For example, the log-polar transform may be applied to a magnitude of a frequency domain signal. In a further example, the phase correlation techniques may provide an amount of translation offset between the evaluated tile 404a and the reference tile 402a, which provides an amount of shift between the images. In yet another example, the phase correlation techniques may provide an amount of skew between the evaluated tile 404a and the reference tile 402a.

In various embodiments, the measurement engine 310 applies scikit-image (or Skimage) algorithms to perform the phase correlation techniques described herein. Other types of implementations or techniques may be applied to measure alignment including, for example, Discrete Fourier Transform and Fourier-Mellin Transform. Many variations are possible.

The tile classification engine 312 may be configured to classify a tile as being aligned or misaligned with respect to a reference tile. In various embodiments, the tile classification engine 312 may compare measurements determined by the measurement engine 310 to corresponding alignment thresholds. For example, the tile classification engine 312 may compare the amount of rotation measured between the evaluated tile 404a and the reference tile 402a to a rotation threshold. As an example, the rotation threshold may be defined as 5 degrees rotation. In this example, if the amount of rotation measured between the evaluated tile 404a and the reference tile 402a is within 5 degrees, then the evaluated tile 404a is determined to be aligned in terms of rotation. Otherwise, the evaluated tile 404a is determined to be misaligned in terms of rotation. Many variations are possible.

Similarly, the tile classification engine 312 may compare the difference in scale measured between the evaluated tile 404a and the reference tile 402a to a scale threshold. As an example, the scale threshold may require the images to be of the same scale. In this example, if the evaluated tile 404a and the reference tile 402a are identical in scale, then the evaluated tile 404a is determined to be aligned in terms of scale. Otherwise, the evaluated tile 404a is determined to be misaligned in terms of scale. Many variations are possible.

In another example, the tile classification engine 312 may compare the shift measured between the evaluated tile 404a and the reference tile 402a to a shift threshold. As an example, the scale threshold may be defined as 1.5 meters. In this example, if the shift between the evaluated tile 404a and the reference tile 402a is within 1.5 meters, then the evaluated tile 404a is determined to be aligned in terms of scale. Otherwise, the evaluated tile 404a is determined to be aligned in terms of shift. Many variations are possible.

Based on the individual measurements, the tile classification engine 312 may classify the evaluated tile 404a as being aligned with the reference tile 402a. For example, in some embodiments, if a determination is made that each the alignment measurements satisfy their respective thresholds, for example, with respect to rotation, scale, and shift, then the evaluated tile 404a may be classified as being aligned with the reference tile 402a. In such embodiments, if a determination is made that at least one of the measurements do not satisfy their respective thresholds, then the evaluated tile 404a may be classified as being misaligned with the reference tile 402a.

Other implementations are contemplated. For example, in some embodiments, if a determination is made that at least a threshold amount of the measurements satisfies their respective thresholds, for example, with respect to rotation, scale, and shift, then the evaluated tile 404a may be classified as being aligned with the reference tile 402a. In such embodiments, if a determination is made that the threshold amount of measurements do not satisfy their respective thresholds, then the evaluated tile 404a may be classified as being misaligned with the reference tile 402a.

The tile classification engine 312 may continue processing and classifying each tile of the evaluated image 404 and a corresponding tile of the reference image 402, as described herein.

The registration engine 314 may determine whether to co-register images based on tile classifications (e.g., aligned or misaligned) determined by the tile classification engine 312. For example, based on the classifications of the tiles associated with the evaluated image 404, the registration engine 314 may determine whether to co-register the evaluated image 404 with the reference image 402.

In various embodiments, the registration engine 314 may determine to co-register the evaluated image 404 with the reference image 402 when at least a threshold amount (e.g., number, percentage) of the tiles of the evaluated image 404 satisfy a tile threshold. For example, the registration engine 314 may determine whether at least 70 percent of the tiles are classified as aligned. Many variations are possible.

In this example, if the registration engine 314 determines that the threshold percentage of the tiles are classified as aligned, then the evaluated image 404 may be co-registered with the reference image 402. In various embodiments, co-registered images may be automatically consumed for various real-time pipelines and applications, such as measuring changes in vegetation within the geographic region over time. Many other applications are contemplated.

In contrast, if the registration engine 314 determines that the threshold percentage is not satisfied, then the evaluated image 404 may be categorized as misaligned with respect to the reference image 402. In various embodiments, once categorized as misaligned, the evaluated image 404 may be submitted for further processing. For example, in some embodiments, the evaluated image 404 may be submitted for manual co-registration by a human. Many variations are possible.

Figure 5A:
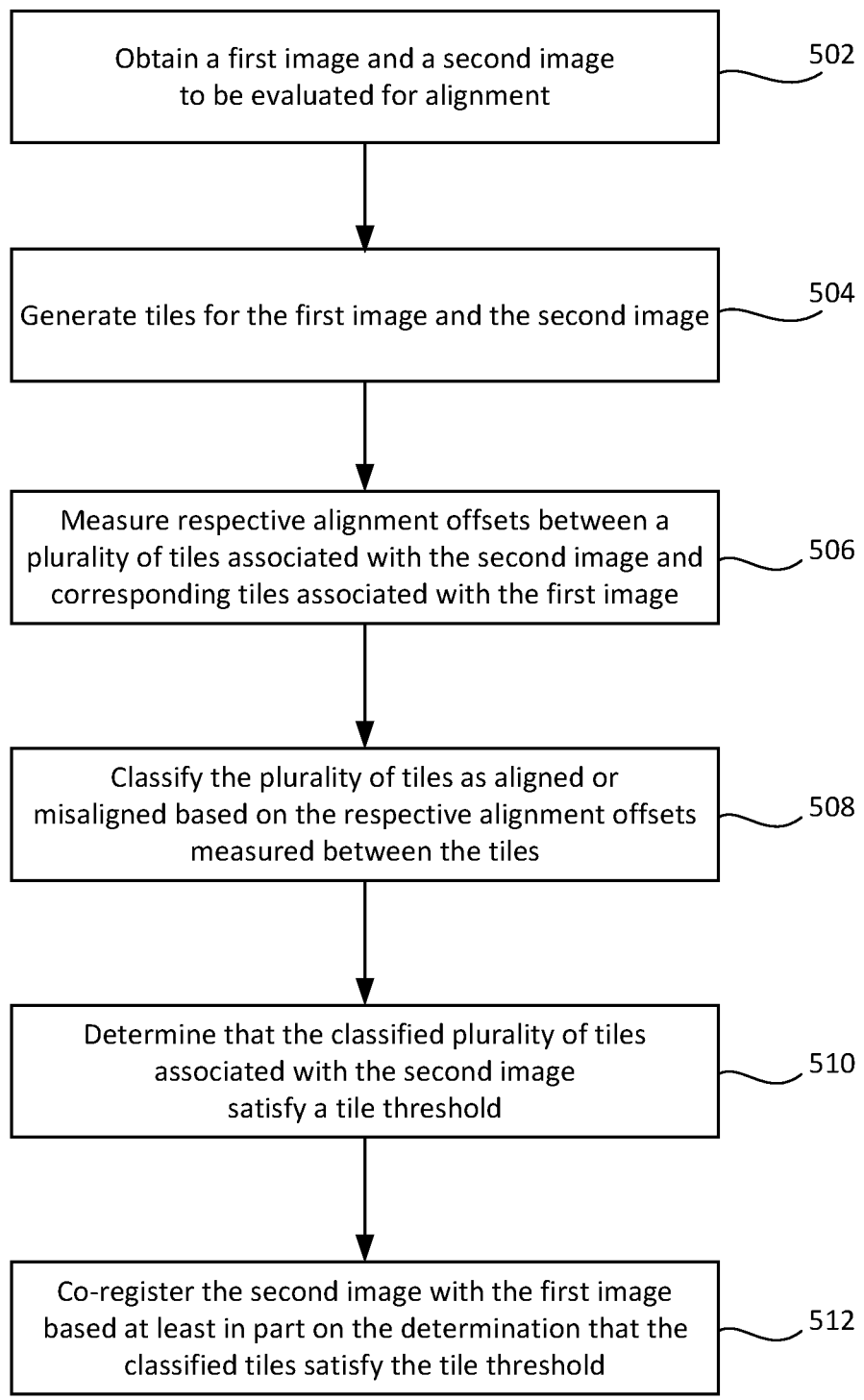
FIG. 5A illustrates an example process for co-registering images according to some embodiments.

FIG. 5A illustrates an example process for co-registering images according to some embodiments. In step 502, a first image and a second image may be obtained. The first image is a reference image that serves as ground truth data. The second image is an image to be evaluated with respect to the first image for alignment. For example, the first image may be a satellite image of a geographic region and the second image may also be a satellite image of the geographic region captured at a different point in time. In step 504, tiles for the first image and the second image may be generated. The first image may be divided into a grid of tiles and the second image may be divided into a corresponding grid of tiles having a consistent size. In step 506, one or more respective alignment offsets may be measured between each of a plurality of tiles associated with the second image and corresponding tiles associated with the first image. In step 508, each of the plurality of tiles may be classified as aligned or misaligned. The classification may be based on the respective alignment offsets measured between the plurality of tiles associated with the second image and the corresponding tiles associated with the first image. In step 510, a determination may be made that at least a threshold amount of tiles associated with the second image satisfy a tile threshold. In step 512, the second image may be co-registered with the first image based at least in part on the determination that the classified plurality of tiles associated with the second image satisfy the tile threshold. Many variations are possible, as described herein.

Figure 5B:
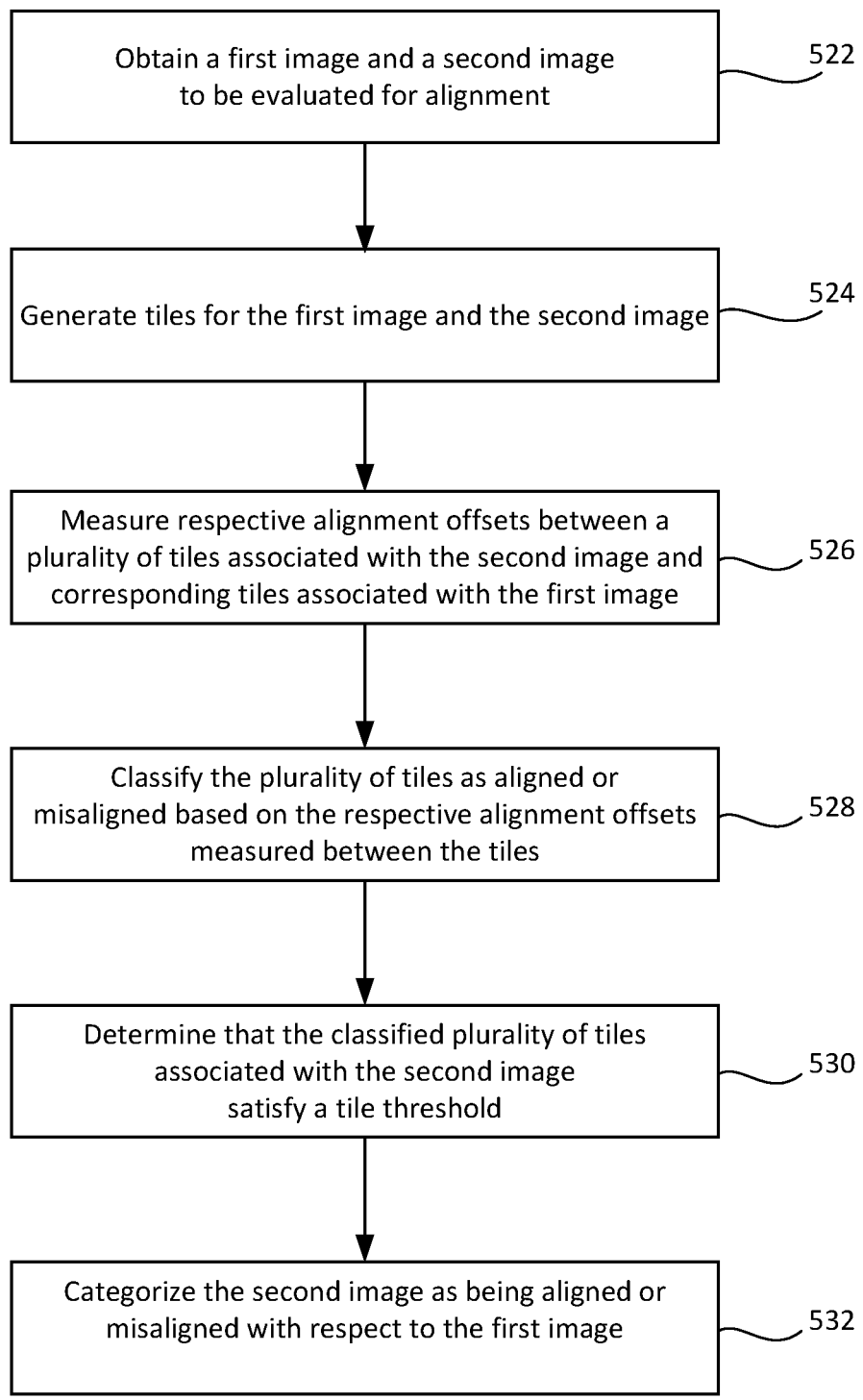
FIG. 5B illustrates an example process for categorizing misaligned images according to some embodiments.

FIG. 5B illustrates an example process for categorizing misaligned images according to some embodiments. In step 522, a first image and a second image may be obtained. The first image is a reference image that serves as ground truth data. The second image is an image to be evaluated with respect to the first image for alignment. For example, the first image may be a satellite image of a geographic region and the second image may also be a satellite image of the geographic region captured at a different point in time. In step 524, tiles for the first image and the second image may be generated. The first image may be divided into a grid of tiles and the second image may be divided into a corresponding grid of tiles having a consistent size. In step 526, one or more respective alignment offsets may be measured between each of a plurality of tiles associated with the second image and corresponding tiles associated with the first image. In step 528, each of the plurality of tiles may be classified as aligned or misaligned. The classification may be based on the respective alignment offsets measured between the plurality of tiles associated with the second image and the corresponding tiles associated with the first image. In step 530, a determination may be made that the classified plurality of tiles associated with the second image satisfy a tile threshold. In step 532, the second image may be categorized as being misaligned with respect to the first image based at least in part on the determination that the classified plurality of tiles associated with the second image satisfy the tile threshold. Many variations are possible, as described herein.

Figure 6:
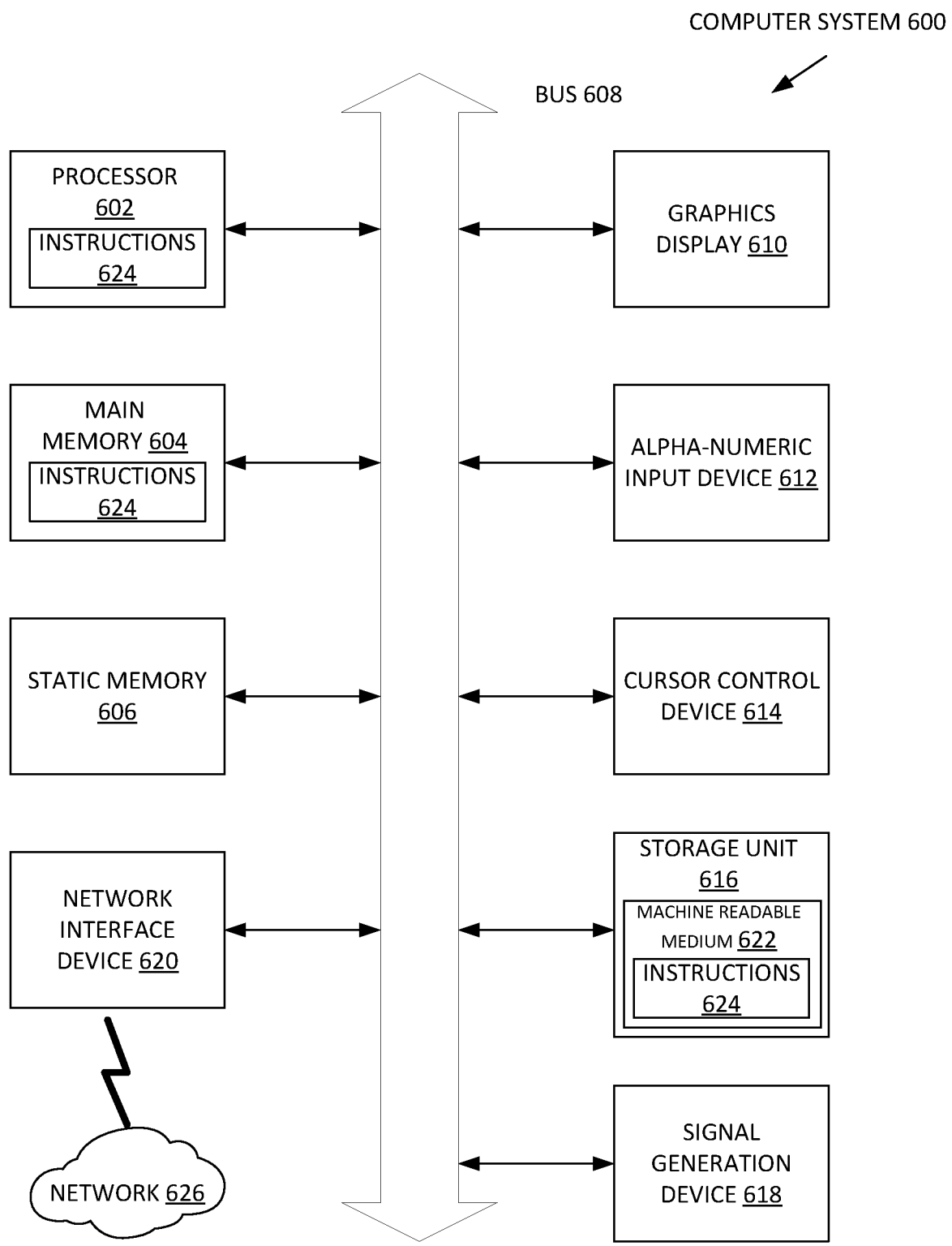
FIG. 6 is a block diagram illustrating a computing device in one example.

FIG. 6 is a block diagram illustrating a digital device in one example. The digital device may read instructions from a machine-readable medium and execute those instructions by a processor to perform the machine processing tasks discussed herein, such as the engine operations discussed above. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a data store 616, a signal generation device 618 (e.g., a speaker), and a network interface device 620, which also is configured to communicate via the bus 608.

The data store 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via network interface 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 6. Alternatively, hardware or software engines may be stored elsewhere within a computing system.

As referenced herein, a computer or computing system includes hardware elements used for the operations described here regardless of specific reference in FIG. 6 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A computer-implemented method comprising:
   obtaining a first image and a second image, wherein the first image is a reference image that serves as ground truth data, and wherein the second image is an image to be evaluated with respect to the first image for alignment;
   generating tiles for the first image and the second image, wherein the first image is divided into a grid of tiles, and wherein the second image is divided into a corresponding grid of tiles;
   measuring one or more respective alignment offsets between each of a plurality of tiles associated with the second image and corresponding tiles associated with the first image;
   classifying each of the plurality of tiles as aligned or misaligned based on the respective alignment offsets measured between the plurality of tiles associated with the second image and the corresponding tiles associated with the first image;
   determining that the classified plurality of tiles associated with the second image satisfy a tile threshold; and
   co-registering the second image with the first image based at least in part on the determination that the classified plurality of tiles associated with the second image satisfy the tile threshold,
   wherein determining that the classified plurality of tiles associated with the second image satisfy the tile threshold comprises:
   determining that at least a threshold percentage of the tiles associated with the second image are classified as aligned with respect to the corresponding tiles associated with the first image.

2. The computer-implemented method of claim 1, wherein the first image is a satellite image of a geographic region, and wherein the second image is a satellite image of the geographic region captured at a different point in time.

3. The computer-implemented method of claim 1, wherein measuring the one or more respective alignment offsets between each of the plurality of tiles associated with the second image and the corresponding tiles associated with the first image comprises:
   applying one or more phase correlation techniques to a tile associated with the second image and a corresponding tile associated with the first image, wherein the respective alignment offsets between the tile associated with the second image and the corresponding tile associated with the first image are measured in a frequency domain.

4. The computer-implemented method of claim 3, wherein an alignment offset measured between the tile associated with the second image and the corresponding tile associated with the first image provides an amount of rotation between the tile associated with the second image and the corresponding tile associated with the first image.

5. The computer-implemented method of claim 3, wherein an alignment offset measured between the tile associated with the second image and the corresponding tile associated with the first image provides a difference in scale between the tile associated with the second image and the corresponding tile associated with the first image.

6. The computer-implemented method of claim 3, wherein an alignment offset measured between the tile associated with the second image and the corresponding tile associated with the first image provides an amount of shift between the tile associated with the second image and the corresponding tile associated with the first image.

7. The computer-implemented method of claim 1, wherein classifying each of the plurality of tiles as aligned or misaligned based on the respective alignment offsets measured between the plurality of tiles associated with the second image and the corresponding tiles associated with the first image comprises:
   determining that a threshold amount of alignment offsets determined for a tile associated with the second image satisfy respective alignment thresholds associated with the alignment offsets.

8. The computer-implemented method of claim 1, further comprising:
   normalizing the first image and the second image based on one or more image normalization techniques.

9. The computer-implemented method of claim 8, wherein the normalization techniques include one or more of: removing shadows present in the first image or the second image; converting the first image or the second image into grayscale format; or resizing the second image to correspond to image dimensions associated with the first image.

10. A system comprising at least one processor and memory storing instructions that cause the system to perform:
    obtaining a first image and a second image, wherein the first image is a reference image that serves as ground truth data, and wherein the second image is an image to be evaluated with respect to the first image for alignment;
    generating tiles for the first image and the second image, wherein the first image is divided into a grid of tiles, and wherein the second image is divided into a corresponding grid of tiles;
    measuring one or more respective alignment offsets between each of a plurality of tiles associated with the second image and corresponding tiles associated with the first image;
    classifying each of the plurality of tiles as aligned or misaligned based on the respective alignment offsets measured between the plurality of tiles associated with the second image and the corresponding tiles associated with the first image;
    determining that the classified plurality of tiles associated with the second image satisfy a tile threshold; and
    co-registering the second image with the first image based at least in part on the determination that the classified plurality of tiles associated with the second image satisfy the tile threshold,
    wherein determining that the classified plurality of tiles associated with the second image satisfy the tile threshold comprises:
    determining that at least a threshold percentage of the tiles associated with the second image are classified as aligned with respect to the corresponding tiles associated with the first image.

11. The system of claim 10, wherein the first image is a satellite image of a geographic region, and wherein the second image is a satellite image of the geographic region captured at a different point in time.

12. The system of claim 10, wherein measuring the one or more respective alignment offsets between each of the plurality of tiles associated with the second image and the corresponding tiles associated with the first image causes the system to perform:
 applying one or more phase correlation techniques to a tile associated with the second image and a corresponding tile associated with the first image, wherein the respective alignment offsets between the tile associated with the second image and the corresponding tile associated with the first image are measured in a frequency domain.

13. The system of claim 12, wherein an alignment offset measured between the tile associated with the second image and the corresponding tile associated with the first image provides an amount of rotation between the tile associated with the second image and the corresponding tile associated with the first image.

14. The system of claim 12, wherein an alignment offset measured between the tile associated with the second image and the corresponding tile associated with the first image provides a difference in scale between the tile associated with the second image and the corresponding tile associated with the first image.

15. A system comprising at least one processor and memory storing instructions that cause the system to perform:
 obtaining a first image and a second image, wherein the first image is a reference image that serves as ground truth data, and wherein the second image is an image to be evaluated with respect to the first image for alignment;
 generating tiles for the first image and the second image, wherein the first image is divided into a grid of tiles, and wherein the second image is divided into a corresponding grid of tiles;
 measuring one or more respective alignment offsets between each of a plurality of tiles associated with the second image and corresponding tiles associated with the first image;
 classifying each of the plurality of tiles as aligned or misaligned based on the respective alignment offsets measured between the plurality of tiles associated with the second image and the corresponding tiles associated with the first image;
 determining that the classified plurality of tiles associated with the second image satisfy a tile threshold; and
 categorizing the second image as being aligned or misaligned with respect to the first image based at least in part on the determination that the classified plurality of tiles associated with the second image satisfy the tile threshold,
 wherein determining that the classified plurality of tiles associated with the second image satisfy the tile threshold comprises:
 determining that at least a threshold percentage of the tiles associated with the second image are classified as aligned with respect to the corresponding tiles associated with the first image.

16. The system of claim 15, wherein the second image is categorized as misaligned, and wherein the system further performs:
 providing the second image and the first image for manual co-registration by a human operator based on the categorization of the second image as being misaligned with respect to the first image.

17. The system of claim 15, wherein an alignment offset measured between a tile associated with the second image and a corresponding tile associated with the first image provides an amount of rotation between the tile associated with the second image and the corresponding tile associated with the first image.

18. The system of claim 15, wherein an alignment offset measured between a tile associated with the second image and a corresponding tile associated with the first image provides a difference in scale between the tile associated with the second image and the corresponding tile associated with the first image.

19. The system of claim 15, wherein an alignment offset measured between a tile associated with the second image and a corresponding tile associated with the first image provides an amount of shift between the tile associated with the second image and the corresponding tile associated with the first image.

* * * * *